(12) United States Patent
Casey et al.

(10) Patent No.: US 8,856,118 B2
(45) Date of Patent: Oct. 7, 2014

(54) CREATION AND TRANSMISSION OF RICH CONTENT MEDIA

(75) Inventors: Steven M. Casey, Littleton, CO (US);
Charles I. Cook, Louisville, CO (US);
Michael D. Sprenger, Boulder, CO (US); Gnanasegeran Selvadurai, Lafayette, CO (US)

(73) Assignee: Qwest Communications International Inc., Denver, CO (US)

( * ) Notice: Subject to any disclaimer, the term of this patent is extended or adjusted under 35 U.S.C. 154(b) by 318 days.

(21) Appl. No.: 11/264,190

(22) Filed: Oct. 31, 2005

(65) Prior Publication Data

US 2007/0100904 A1    May 3, 2007

(51) Int. Cl.
*G06F 17/30* (2006.01)
*G06F 15/16* (2006.01)

(52) U.S. Cl.
CPC ....... *G06F 17/30056* (2013.01); *Y10S 707/914* (2013.01)
USPC ............. 707/736; 707/914; 709/217; 725/39; 725/153

(58) Field of Classification Search
USPC ................. 707/201, 913; 725/37–61, 40, 153
See application file for complete search history.

(56) References Cited

U.S. PATENT DOCUMENTS

| | | | | |
|---|---|---|---|---|
| 5,987,509 | A * | 11/1999 | Portuesi ........................ | 725/113 |
| 6,040,829 | A * | 3/2000 | Croy et al. .................... | 715/864 |
| 6,097,441 | A * | 8/2000 | Allport ......................... | 348/552 |
| 6,263,507 | B1 * | 7/2001 | Ahmad et al. ................ | 725/134 |
| 6,828,988 | B2 * | 12/2004 | Hudson et al. ................ | 715/711 |
| 6,862,741 | B1 * | 3/2005 | Grooters ........................ | 725/39 |
| 6,940,558 | B2 * | 9/2005 | Lu et al. ........................ | 348/553 |
| 7,190,345 | B2 * | 3/2007 | Nashida et al. ................ | 345/156 |
| 7,523,478 | B2 * | 4/2009 | Blackketter et al. ........... | 725/52 |
| 7,536,706 | B1 * | 5/2009 | Sezan et al. ................... | 725/113 |
| 2001/0001160 | A1 * | 5/2001 | Shoff et al. .................... | 725/51 |
| 2002/0042813 | A1 * | 4/2002 | Ullman et al. ................ | 709/203 |
| 2002/0129692 | A1 * | 9/2002 | Barile ............................ | 84/609 |
| 2002/0162120 | A1 * | 10/2002 | Mitchell ....................... | 725/135 |
| 2003/0093791 | A1 * | 5/2003 | Julia et al. ...................... | 725/40 |
| 2004/0024898 | A1 * | 2/2004 | Wan .............................. | 709/231 |
| 2005/0015713 | A1 * | 1/2005 | Plastina et al. ............. | 715/500.1 |
| 2005/0149557 | A1 * | 7/2005 | Moriya et al. ............. | 707/104.1 |
| 2005/0193425 | A1 * | 9/2005 | Sull et al. ...................... | 725/135 |
| 2005/0251823 | A1 * | 11/2005 | Saarikivi ........................ | 725/42 |
| 2006/0010482 | A1 * | 1/2006 | Li ................................. | 725/153 |
| 2006/0064716 | A1 * | 3/2006 | Sull et al. ........................ | 725/37 |
| 2006/0064734 | A1 * | 3/2006 | Ma ................................ | 725/136 |
| 2006/0075451 | A1 * | 4/2006 | Gupta et al. .................. | 725/135 |

* cited by examiner

*Primary Examiner* — Usmaan Saeed
*Assistant Examiner* — Brittany N Allen
(74) *Attorney, Agent, or Firm* — Swanson & Bratschun, L.L.C.

(57) ABSTRACT

A method of playing a rich content stream that includes a media stream and a descriptive stream. The method may include the steps of receiving the rich content stream at a media player, where the descriptive stream is generated from a rich content file executed separately from a source for the media stream, and where the media stream and the descriptive stream are received as separate streams at the media player. The method may also include synchronizing the media stream and the descriptive stream at the media player so that information in the descriptive stream is temporally synchronized with media content playing from the media stream. In addition the method may include activating the playing of the descriptive stream while the media stream is playing on the media player, where descriptive content from the descriptive stream is not played on the media player until being activated by a user.

35 Claims, 9 Drawing Sheets

CREATION AND TRANSMISSION OF RICH CONTENT MEDIA

BACKGROUND OF THE INVENTION

Traditional television and radio are progressing from being a one-way conduit of information, from a broadcaster to the public, into a more interactive experience. Before the widespread adoption of the Internet, this interactivity included, for example, cable television shows and networks devoted to selling goods and services to the viewing public over the telephone. Information about the goods or services would be broadcast to television viewers along with a telephone number and other identifying information that enabled an interested viewer to order the item over a telephone.

More recent examples include the development of pay-per-view and in video-on-demand services where a viewer can view a movie, sporting event, concert, television show, etc. by placing an order through the telephone or television cable with the content provider. While these and other examples show progress being made in the interactivity of traditional broadcast media, the interactivity still only generally tailored to the interests of viewers. The shopping programs display just one or a small group of items at a time, which may hold no interest for a significant percentage of the viewers. Similarly, the content selection for pay-per-view and video-on-demand is typically limited to a collection of movies and programs that is estimated to have the widest popular appeal.

The interactivity of audio-video media can increase substantially when those media are received through the Internet. Many services are available on the Internet for a user to receive and play streaming audio and video, typically through a personal computer. The size and global interconnectivity of the public Internet provide a user with an almost limitless choice of audio and video content to play, a vast library of information for research, and a large, dynamic collections of goods and services to buy. Unfortunately, the visual and audio quality of streaming media sent through the Internet is generally inferior to that of conventional broadcast television and radio.

Up to this point, the growth and development of traditional broadcast media (e.g., radio, television), and media received through the Internet have mostly followed independent paths. While it is possible today to display media content received from the Internet on a conventional television, or watch a television broadcast through a computer connected to the Internet, most media consumers do not watch or listen to media content this way. This is expected to change with the widespread adoption of devices that are capable of processing and playing media content from both traditional broadcasters and Internet content providers on televisions, home audio systems, home theater systems, personal audio systems, and other kinds of media playing devices.

In expectation of this convergence of broadcast and Internet media, systems and processes are being developed to deliver rich content media to the new media playing devices. This rich content media includes both conventional audio and video media content as well as descriptive content that provide information about people, places, events, objects, music, etc., in the media content being played by the playing device. Unfortunately, most of the rich media content available today mixes the media and descriptive content together into a single rich content stream. As a result, media players unable to process the rich content stream cannot play either the media content or descriptive content, limiting the compatibility of rich media with legacy, and even new, media playing devices.

Compatibility concerns can discourage media consumers from buying new media playing devices, slowing the adoption of rich media content as a new, more interactive mode of experiencing media content. Thus, there is a need for systems and methods of playing rich media content that has good compatibility qualities for both existing and new media playing devices. There is also a need for systems and methods of creating rich media content that is compatible with both new and legacy media playing devices. These and other issues are addressed by aspects of the present invention.

BRIEF SUMMARY OF THE INVENTION

Embodiments of the invention include methods of playing a rich content stream that includes a media stream and a descriptive stream. The methods may include the steps of receiving the rich content stream at a media player, where the descriptive stream is generated from a rich content file executed separately from a source for the media stream, and where the media stream and the descriptive stream are received as separate streams at the media player. The methods may also include synchronizing the media stream and the descriptive stream at the media player so that information in the descriptive stream is temporally synchronized with media content playing from the media stream. In addition the methods may include activating the playing of the descriptive stream while the media stream is playing on the media player, where descriptive content from the descriptive stream is not played on the media player until being activated by a user.

Embodiments of the invention also include methods of providing rich media data to a media player operated by a user. The methods may include the steps of creating a media file comprising media content, and creating a rich content file separate from the media file, where the rich content file comprises descriptive content related to the media content. The methods may further include streaming the media file and the rich content file across an electronic network, and synchronizing, with the media player, a media stream from the media file with a descriptive stream from the rich content file so that the descriptive content in the descriptive stream is temporally synchronized with media content playing from the media stream. In addition, the methods may include storing the rich content file on an electronic storage device controlled by the user.

Embodiments of the invention still further include methods of providing rich media content to a television. The methods may include displaying an electronic program guide on the television, and selecting data from a descriptive stream that is being displayed on the television with the electronic program guide. The methods may also include displaying the data on the television, where the data is sent through the descriptive stream, and displaying a media stream on the television in response to a selection offered in the display of the data. In these methods, the media stream may be separate from the descriptive stream.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION OF THE INVENTION

Figure 1:
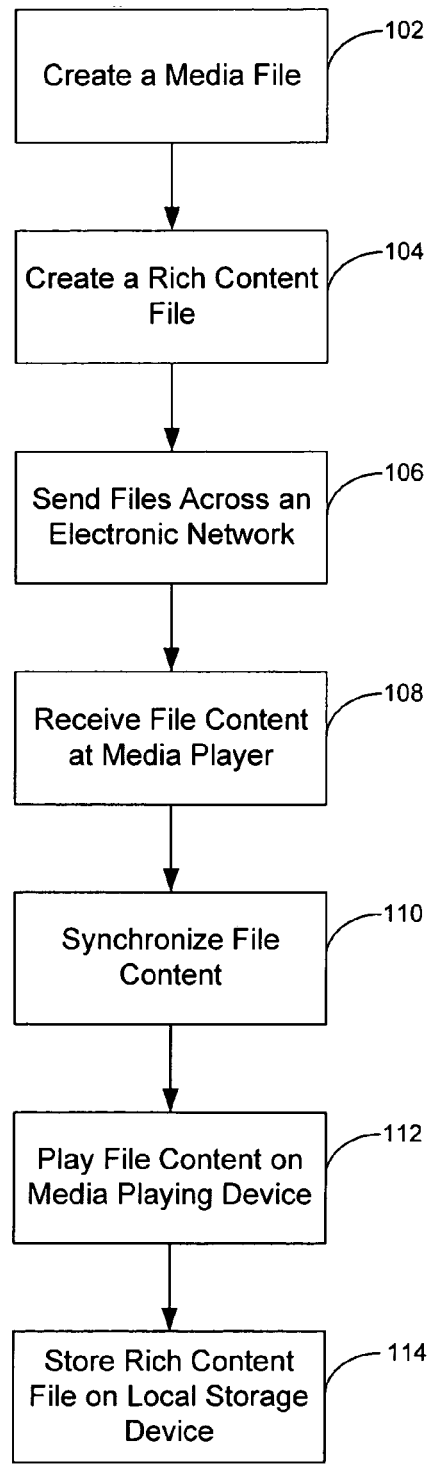
FIG. 1 is a flowchart showing steps in a method of creating and providing rich media content to a media player according to embodiments of the invention.

The present invention includes methods and systems for creating and sending rich media content made from separate media and descriptive content. The media content may include audio content (e.g., music, sounds, songs, lectures, news, radio talk shows, etc.) and video content (e.g., pictures, television shows, movies, etc.) that can be played on a variety of media playing devices (e.g., home audio systems, portable stereos, cellular telephones, personal digital assistants, radios, portable digital audio players, televisions, home theater systems, desktop computers, laptop computers, tablet computers, etc.).

The descriptive content may include information and links about the media content being played. For audio only media playing devices, the descriptive information may be displayed as text and/or graphics that appear in a descriptive information display on the device. For audio-video media playing devices, the descriptive information may also appear in a dedicated descriptive information display and/or directly on the display (e.g., television screen, computer monitor, etc.) for the media content. The displayed descriptive content may include information about the people, places, and objects currently displayed on the screen, as well as links (e.g., an Internet hyperlink) to more information.

The media content and descriptive content that make up the rich media content of the present invention may be separately created and stored as separate electronic files. The two types of content may also be sent as separate information streams with independent formats, across the electronic network to the media playing device. By creating separate files with independent formats for the media and descriptive streams, media content having a variety of formats can be played with the descriptive content.

A media player may include the instructions, software, firmware, logic, etc. for processing the media and descriptive content received from an electronic network so that it may be displayed on the media playing device. A media player may operate entirely as software running on a computer, or may include hardware, firmware and/or software in a device (e.g., a set-top-box) that communicates with a media playing device (e.g., a television). In additional embodiments, the media player may be integrated into the media playing device.

Embodiments of the invention also include media players, and media playing devices, where the media stream may be processed and played but the descriptive stream cannot. In these media players, which will typically have older software, firmware, and/or hardware, the descriptive stream can be ignored as the media stream is played. This adds backwards compatibility to the rich content created according to the present invention, where fully compatible media playing devices can play both the media and descriptive content, while legacy media players and/or media playing devices can still at least play the media content.

Embodiments of the invention include systems for sending the rich content over an IP network (e.g., the Internet) to a media player that operates in a set-top-box that is in electronic communication with an audio-video display (e.g., television, home theater system, etc.). The IP network may also be connected to an electronic storage device, either through the set-top-box or a different node, to store the descriptive content displayed with the media content on the display. This allows a viewer to search the descriptive content at a more convenient time (e.g., after a television program or movie is over).

Referring now to FIG. 1, a flowchart shown with steps for a method 100 of creating and providing rich media content to a media player according to embodiments of the invention. The method 100 includes creating a media file 102 from a source of media content. The source of media content may include a television broadcast, a movie, a webcast, a radio broadcast, stored audio content (e.g., music CD, a digital-audio tape, a cassette tape, an 8-track tape, a phonograph record, a memory card, a hard disk drive, etc.), and stored video content (e.g., a digital video disc (DVD), a video cassette tape, a digital video tape, a memory card, a hard disk drive, etc.) among other media sources.

The creation of the media file 102 may include formatting and/or encoding the source of the media content so that the file may be sent (e.g., streamed) across an electronic network to reach the media player and be played on the media playing device. For example, creation of the media file may include encoding the media content into a compressed file (e.g., Moving Pictures Experts Group (MPEG) encoding) and formatting the file so that to it may be sent through the Internet to the media player (e.g., TCP/IP protocol formatting).

The method 100 also includes creating a rich content file (RCF) that contains the descriptive content portion of the rich media. The RCF may be created as a separate file from the media file, and may be encoded and/or formatted independently of the media file. For example, the RCF may be created as an extensible markup language (XML) file, while the media file may be created as an MPEG file (e.g., an MPEG-2 file, MPEG-4 file, etc.). Both files may be sent across the electronic network 106 and where they may be received at a media player 108. Methods of sending the media and rich content files may include dividing the files into discrete packets and streaming the packets across the network where they arrive at the media player for "just-in-time" playing on the media playing device. A subset of the streaming packets may be buffered at the media player before being played to reduce pauses and choppiness of the played audio and/or video stream.

When at least a portion of the media file and RCF are received at the media player 108, the media player may synchronize the execution of the files so that the descriptive stream is temporally matched with the media stream played on the media playing device. The synchronization of the two types of content may include the use of a timing signal generated with the execution of the media file (e.g., an MPEG spatial reference code, a packet sequence code, etc.). This timing signal may be used to find a starting point in the descriptive stream generated by the RCF that is temporally aligned with the media stream being played on the media playing device. With the both types of content synchronized by the media player, rich media content may be played on the media playing device 112.

The timing signals may also be used to display a selected segment of the media file on the media playing device 112. For example, the descriptive stream may generate a display of scene selections from the media file that the user can select to play the media file from that scene forward. Scene selection choices may also be customizable and searchable in the descriptive file so that the selections are presented in response to a search query. For example, a user may search the RFC for scenes in the media file where a particular actor appears, or a particular location is shown. In response, the media player 112 displays thumbnail shots of scenes in the media file that satisfy the search query. The user can then select a particular thumbnail shot to start playing a segment of the media file associated with the shot.

In addition, either before, during, and/or after the RFC is played on the media playing device, it may also be stored on a local storage device 114 (e.g., a hard disk drive, a memory card, a portable storage device, etc.). This permits a viewer or listener to view, search, and/or link from the RFC after the media content has been played, and also to execute the RFC on a device other than the media playing device. For example, a viewer may see descriptive content from the RFC played on a television, and later search and link from the locally stored RFC that is being run on a personal computer.

Figure 2:
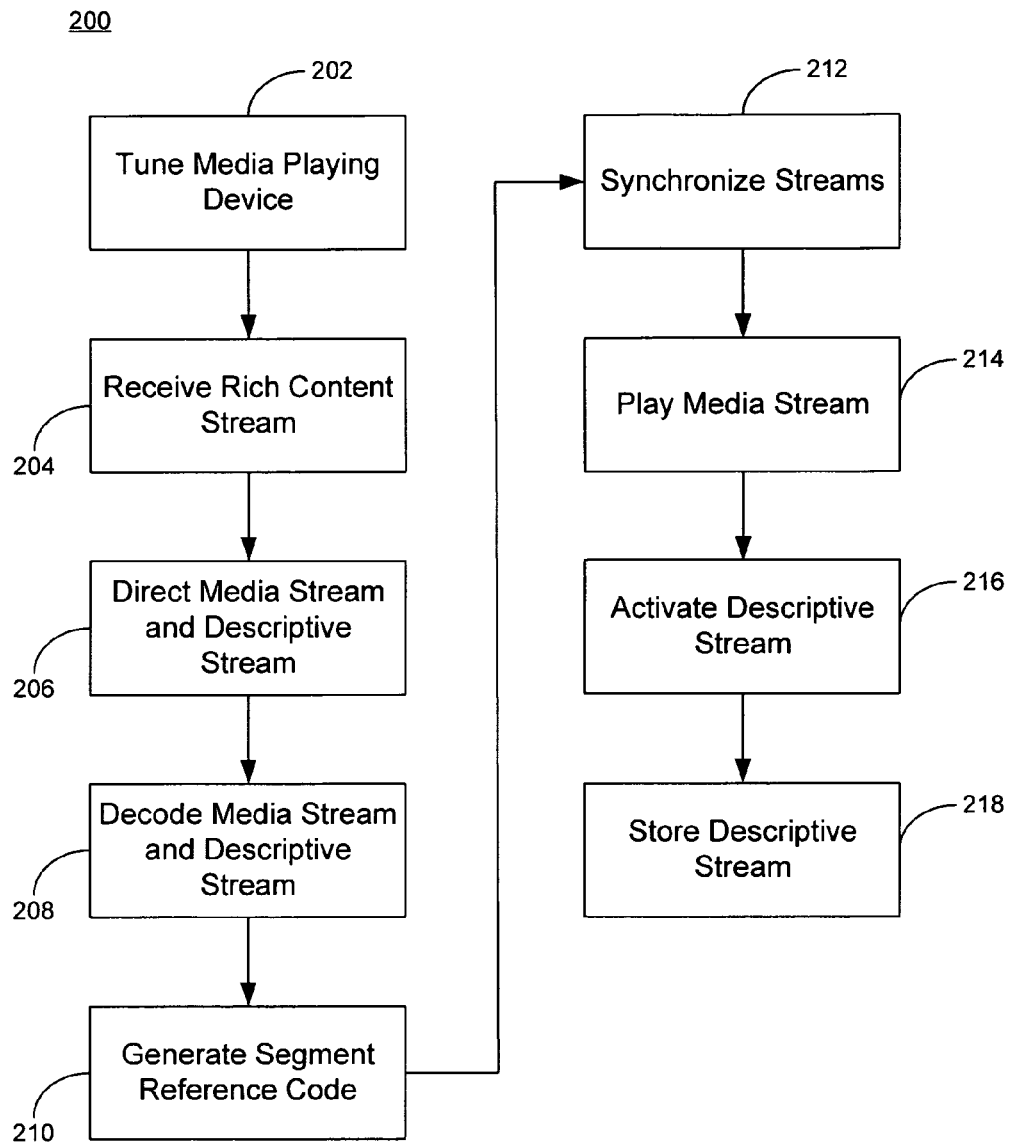
FIG. 2 is a flowchart illustrating a method of playing rich media content on a media player according to embodiments of the invention.

FIG. 2 shows a flowchart illustrating a method 200 of playing rich media content on a media player according to embodiments of the invention. The method 200 may include a viewer or listener tuning the media playing device 202 and receiving a selected rich content stream 204. The tuning process may include the viewer selecting a channel displayed on the media player and/or media playing device, or selecting a link (e.g., an XML hyperlink) displayed on the media playing device. The channel or link may be selected from a group of channels or links in an electronic program guide displayed on the media playing device.

The media stream and descriptive stream that form the rich content may be directed to separate processing components of the media player 206, where they are decoded 208 for playing on the media playing device. When the media stream from the media file is decoded, a segment reference code may be generated 210 in the media player to ensure the sequence and timing of the media content frames are played in the proper order and at the proper frame rate. The media player may also utilize this segment reference code to synchronize the media and descriptive streams 212 for playing on the media playing device.

Once the media stream has been decoded in the media player, it can be played 214 on the media playing device. In the embodiment described in method 200, the descriptive stream is not played on the media playing device until being activated 216 by the viewer or listener. Activation may occur when the user sends a command to the media player to start playing the descriptive content on the media playing device. This command may come from pressing and activating a switch on the media playing device or a switch on a remote control device that is in communication with the media player and/or media playing device.

A viewer or listener can also store the descriptive content from the descriptive stream 218 on a local electronic storage device. The descriptive stream may be stored as the complete RCF for the media content, or a portion of the RCF. Storage of the descriptive stream may occur automatically for all rich content delivered to the media player, and the user may set an expiration date upon which the descriptive content will be deleted from the storage device. The storage device may also be configured to delete older files in order to make room for more recently recorded files on the storage device. Alternatively, storage of the descriptive content may not occur unless the user provides a command to store the content. For example, if the viewer or user wants to store the descriptive content of a movie, show, advertisement, etc. currently playing on the television, she or he can press a button on a remote control that sends a command to the media player to record the descriptive content on the storage device.

One area where the descriptive content of rich content media can enhance a media viewer or listener's experience is in the use of an electronic program guide (EPG) to help the user select media content to play on the media playing device. The information provided by the descriptive content can make the EPG a more interactive and complex tool than is possible with a conventional EPG designed for use with traditional broadcast, cable and satellite television. Conventional EPG commonly consist of little more than a scrolling list of content available on a particular channel at a particular time. The summary of a channel's content displayed on the scrolling list typically consists of little more than the title of the program or movie. For traditional broadcast, cable and satellite television that assign one program per channel per timeslot, these conventional EPGs are adequate for informing the viewer about the typically 50 to 150 programs that are currently viewable on the television.

As radios, televisions, and other media playing devices become capable of playing media content from other types of electronic networks, such as IP networks that can provide IPTV, listening and viewing choices can become so large as to make a conventional EPG cycling through the choices an impractical selection tool. For these more sophisticated electronic networks (as well as the traditional networks) a rich content EPG that includes descriptive content for searching the media content available is a good alternative to a conventional EPG.

Figure 3:
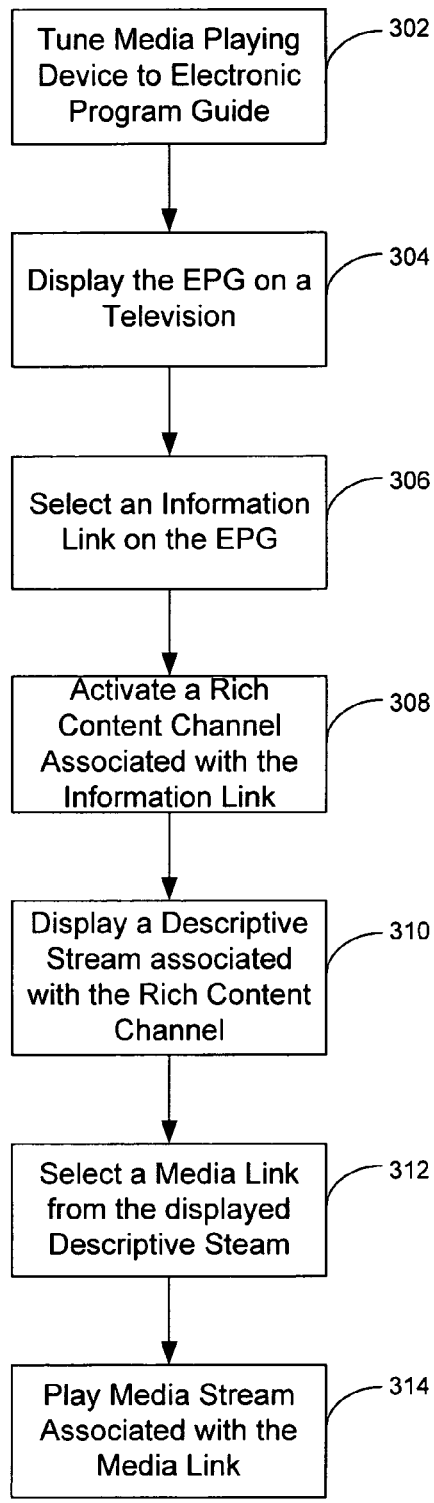
FIG. 3 is a flowchart illustrating a method of selecting rich media content with the aid of an electronic program guide displayed on a media playing device according to embodiments of the invention.

Referring now to FIG. 3, a flowchart is shown illustrating a method 300 of selecting rich media content with the aid of an EPG displayed on a media playing device according to embodiments of the invention. The method 300 includes tuning the media playing device to an electronic program guide (EPG) 302. If the media playing device is for example a television, the EPG may be displayed on the television screen 304, and may include a list of programs available for playing on the television. If the media device is for example a radio, the EPG may be a displayed on text scroll bar or other descriptive content display, and may include a list of songs available for playing on the radio.

When the EPG is displayed on a television 304, a descriptive stream associated with the EPG may also be played. The descriptive stream may cause the display of one or more items of linked text or icons on the television screen that a viewer can select 306 to receive additional information about a piece of media content that is currently playable on the television.

When a viewer selects one of linked items, by for example sending a selection command from a remote control device, a rich content channel associated with the link may be activated 308. Activation of the rich content channel causes the media player to display media and/or descriptive content on the television that is associated with the rich content channel. For example, in the embodiment described in method 300, activating a link may cause a descriptive stream associated with the rich content channel to be displayed in the television 310. The displayed descriptive content may include one or more additional links to media content that a viewer can select 312 to play a media stream associated with the selected media link 314.

Method 300 permits a television viewer to use an rich content EPG according in a way that is similar to conventional EPGs, while also providing the ability to conduct more sophisticated media content searches though the television. For example, a viewer who simply wishes to choose media content in a way that's familiar to conventional EPG users can simply use the descriptive stream as an enhanced channel selection guide for selecting a media stream to play from a group of media streams (e.g., 50 to 100 media streams labeled as separate "channels"). Viewers can also use method 300 to conduct complex, interactive searches of the descriptive content to find the media content that is most relevant to the search query (or queries). These types of searches allow the EPG to be used more like an Internet search engine for media content than as a simple television channel selector.

Figure 4A:
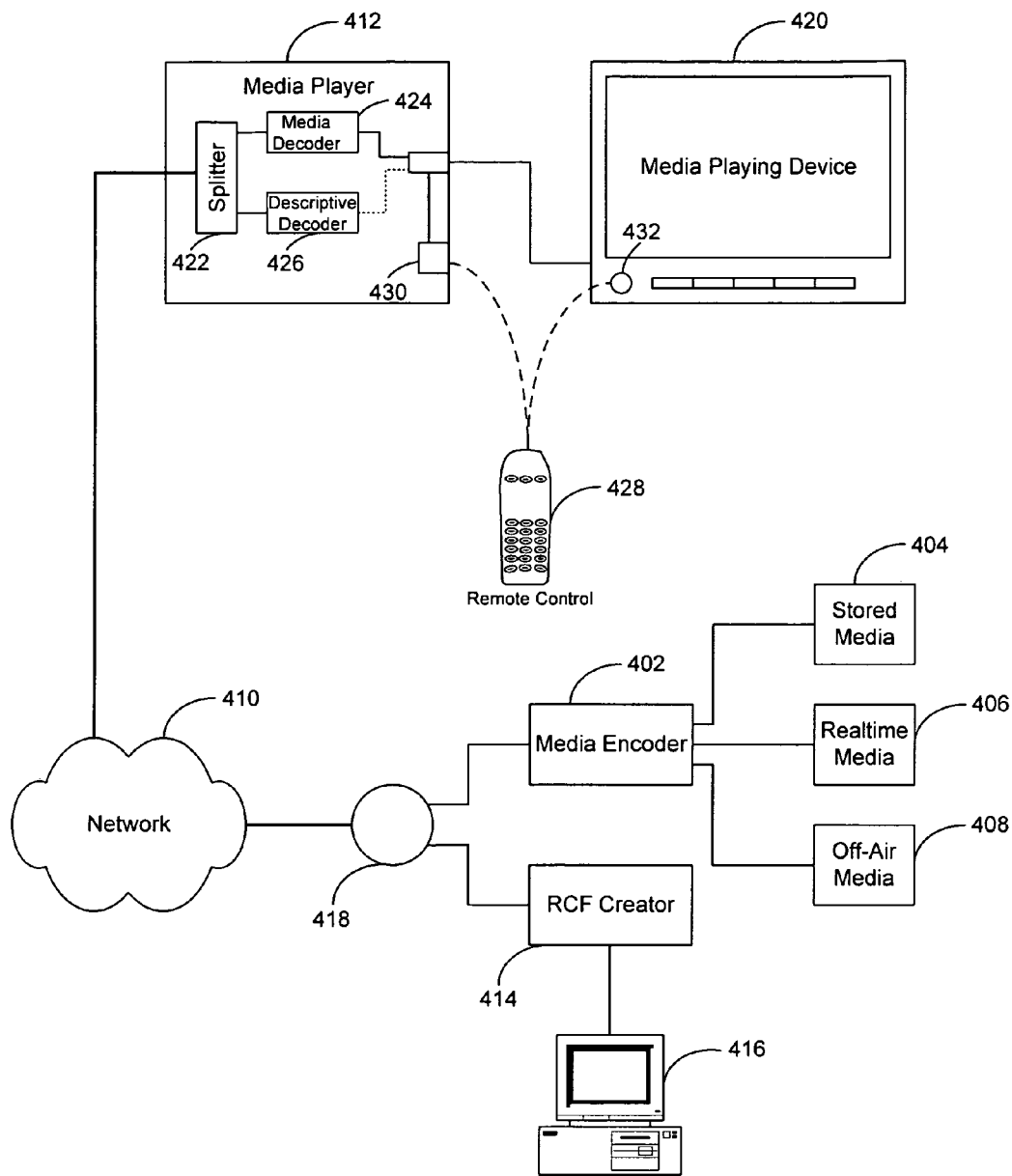
FIG. 4A shows a system for making and sending rich media content according to embodiments of the invention.

Referring now to FIG. 4A, a system 400 for making and sending rich media content according to embodiments of the invention is shown. The system 400 includes a media encoder 402 to encode media content from a media content source, including for example, stored media 404 (e.g., a hard disk drive, a memory card, a portable storage device, a music CD, a digital-audio tape, a cassette tape, an 8-track tape, a phonograph record, a digital video disc (DVD), a video cassette tape, a digital video tape, etc.); realtime media 406 (e.g., television and radio broadcasts, webcasts, etc.); and off-air media 408. The media encoder 402 encodes and formats the media content from the media source so that the content may be sent through an electronic network 410 to the media player 412.

Descriptive content may also be created and formatted by a RCF creator 414 that makes rich content files related to the media files created by media encoder 402. The descriptive content may include content input by a programmer or viewer sitting a computer 416 that can access both the media file and sources of descriptive content, such as a database or Internet website.

The files created by the media encoder 402 and RCF creator 414 may be broken up into packets and streamed across the electronic network 410 to the media player 412. In the embodiment shown in system 400, a coupler 418 may be used to associate packets from the media stream and the descriptive stream so that the media player will know to play the media and descriptive content in the packets at the same time on the media playing device 420. As packets from each information stream arrive at the media player 412, they are split by a splitter 422 such that the media stream is processed by media decoder 424, and the descriptive stream is processed by descriptive decoder 426. Logic in the media player 412 can read information added to the packets by the coupler 418 to synchronize the decoded media and descriptive content played on the media playing device 420.

A remote control 428 operated by the viewer (not shown) may transmit commands to receivers 430 and 432 on the media player 412 and the media playing device 420, respectively. For example, logic in the media player 412 may be configured to not play the descriptive content on the media playing device 420 until a command is received from the remote control 428 to start playing the descriptive content on the device 420. The remote control 428 may also be used to select links and icons from the descriptive content displayed on the media playing device 420. The remote control 428 can also implement a cursor that can be controlled either by arrow keys, roller ball, etc. The descriptive links can also be configured to be present, but invisible until the user places the cursor over the location where the descriptive content resides. This allows the descriptive content to be available without cluttering the viewing screen. The remote control 428 can also toggle between making the descriptive content visible or invisible.

Figure 4B:
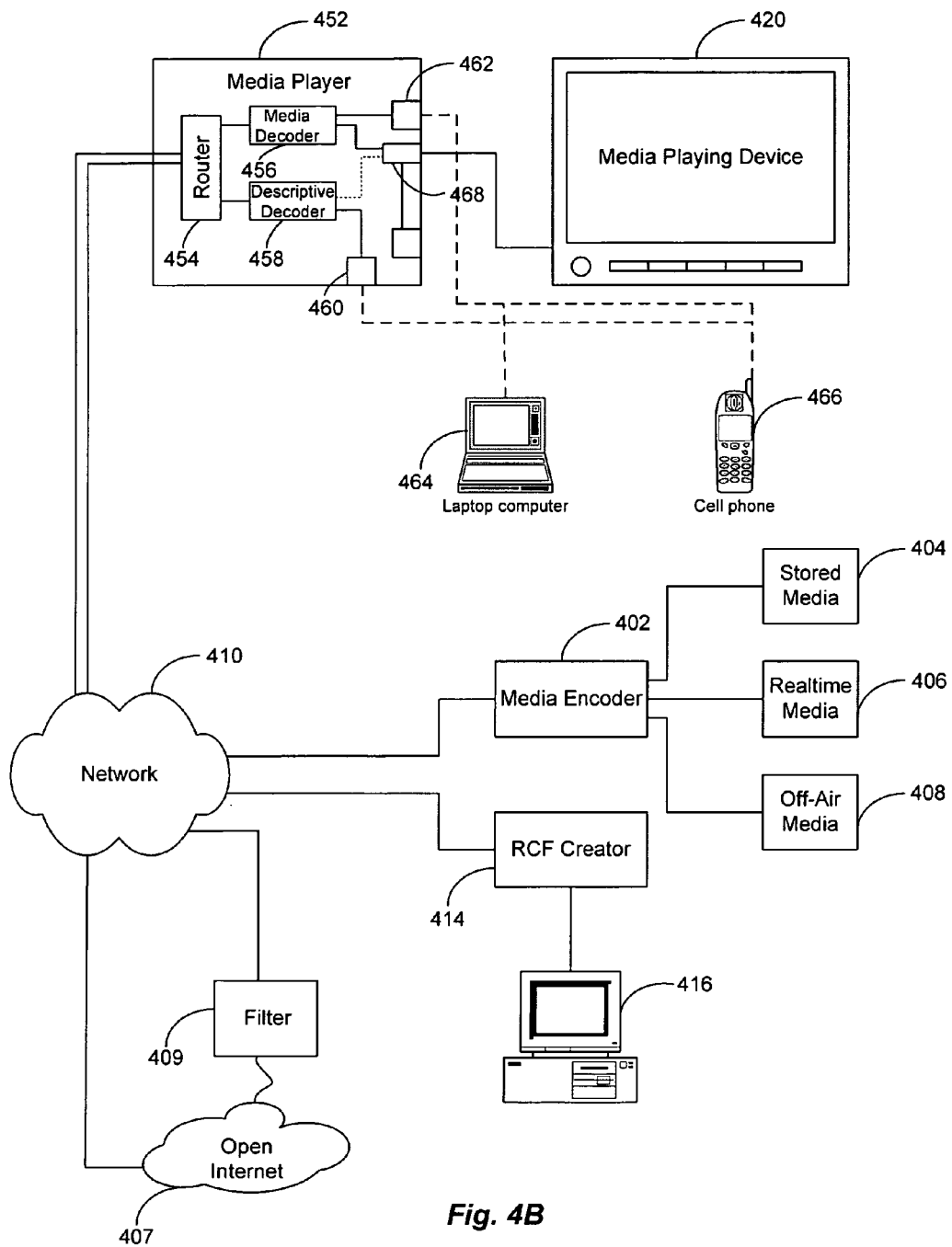
FIG. 4B shows a system that includes a system for making and sending rich media content according to another embodiment of the invention.

FIG. 4B shows another system 450 for making and sending rich media content according to embodiments of the invention. In system 450, the media and descriptive content may be created and encoded similar to system 400. In system 450 a coupler 418 is not used to associate the packets or synchronize the media and descriptive streams sent over the electronic network 410. Instead, the two streams may be synchronized after they have been received at the media player 452.

Media player 452 includes a router 454 that routes each of the streams to the appropriate decoder. The media stream is routed to media decoder 456 and the decoded media content signal may be sent through output 468 to the media playing device 420. The descriptive stream is routed to descriptive decoder 458 where the decoded descriptive content signal is also sent through output 468 to the playing device 420.

System 450 is also capable of sending the media and content streams wirelessly to electronic devices in proximity to the media player 452. In system 450, the media and descriptive decoders 456 and 458 may format the media and descriptive streams, respectively, for wireless transmission to a laptop computer 464 and cell phone 466. The computer 464 and cell phone 466 may be capable of playing the media and/or descriptive content at the same time as the media playing device 420, and they may be used to send wireless instructions back to the media player 452. For example, the media player may be configured by instructions from the viewer (not shown) to play media content on the media playing device 420, and also display related descriptive content on the laptop computer 464. The viewer can search and activate descriptive content on the laptop 464, which responds by providing commands to the media player 452 for playing associated media content on the media playing device 420.

It should be appreciated that numerous variations of the devices and configurations shown in FIGS. 4A-B are contemplated for the invention. For example, media players 412 and 452 are shown as separate devices from the media playing device 420, such as set-top-boxes. Additional embodiments (not shown) have the media player integrated into the media playing device. In fact, it is expected that stand alone media players would be phased out as new media playing devices are made with built-in capabilities for processing and playing rich media content. Similarly, the RCF creator 414 shows as separate from the computer 416 may be a program that operates on the computer 416. The RCF files created by creator 414 may be uploaded by the computer 416 to the electronic network 410.

Additional variations may include the ability of systems 400 and 450 to access data from the public Internet 407. Access may occur by establishing communications between the network 410 and the public Internet 407. A content filter 409 (e.g., a walled garden) may be used to control the types of content received from the public Internet 407 and sent through the network 410 to the media player 452. Computer 416, laptop 464, cellphone 466, and/or other devices with access to the content filter 409, may include executable files to activate the content filter 409 and set parameters for types of content that will be blocked by the content filter 409.

Figure 5:
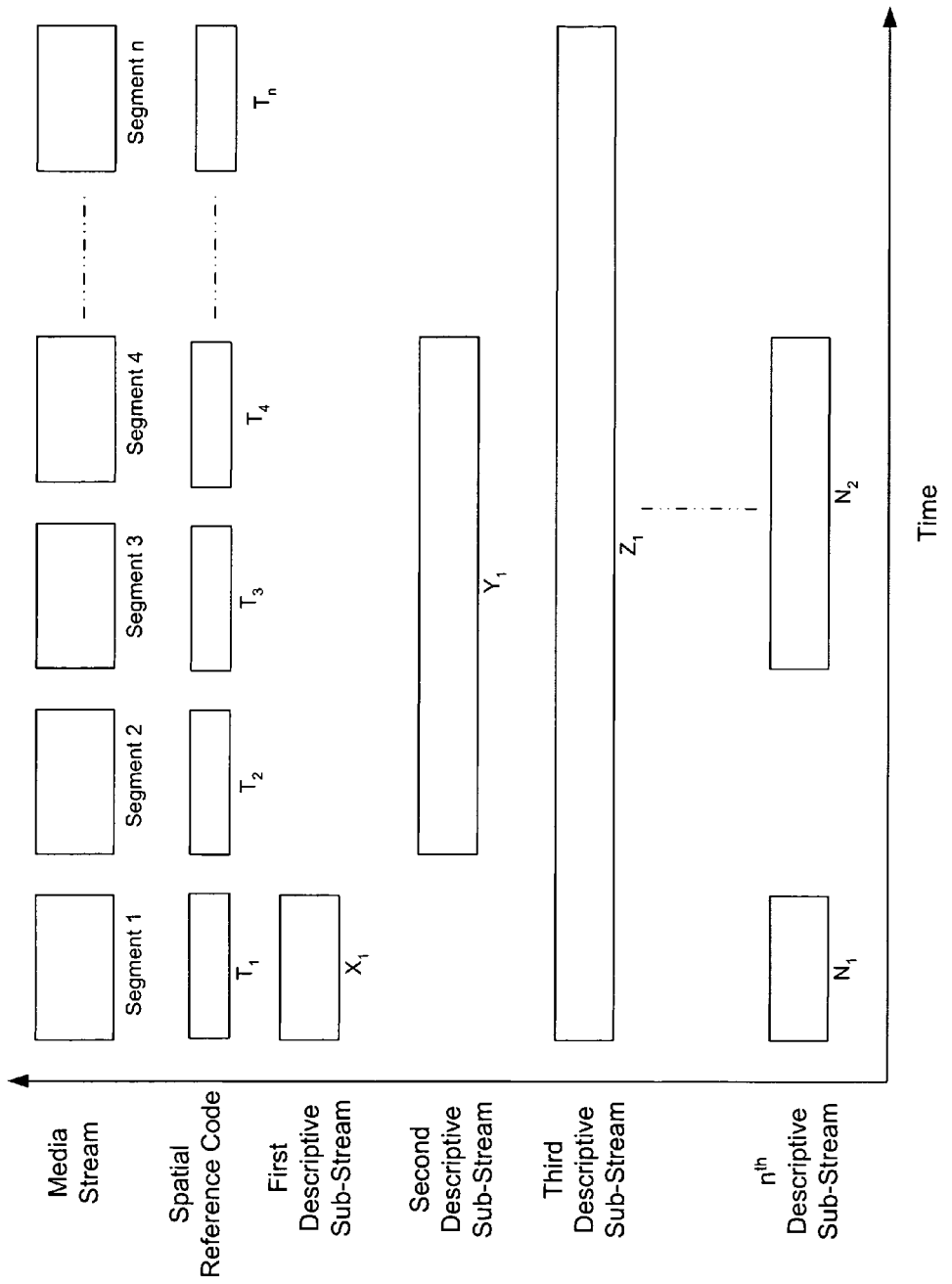
FIG. 5 shows a portion of a rich media content stream made from separate media and descriptive streams according to embodiments of the invention.

Referring now to FIG. 5, a portion of a rich media content stream made from separate media and descriptive streams according to embodiments of the invention is shown. The media stream may be divided into n segments or frames, where each segment has a predefined frame length. A spatial reference code (e.g., timecode) for synchronizing the media stream and descriptive stream may also be included in the rich media content stream. The spatial reference code may be divided into consecutive sequential time segments $T_1$-$T_n$. The length of time of each segment $T_1$-$T_n$ represents the temporal granularity of the spatial reference code. For example, each segment may represent a length of time of about 1 second, $\frac{1}{30}$ of a second, $\frac{1}{60}$ of a second, etc.

There may be more than one spatial reference code associated with the rich media content stream, including multiple codes that span different lengths of the media and descriptive streams. For example, a spatial reference code may span the entire length of the rich media content stream, or a fraction of the entire stream. There may be other spatial reference codes that span different portions of the streams. In addition, a single reference code may span two or more discontinuous portions of the rich media content stream.

The descriptive stream may be divided into a number of sub-streams that have descriptive content designed to be played for a predefined period of time with the media content. For example, the first descriptive sub-stream may be played for a period of time $X_1$ that coincides with segment 1 of the media content. A second descriptive sub-stream may be played for a long period of time $Y_1$, and may start after the first segment of media content is played (e.g., segment 2). A third descriptive sub-stream may be played for the entire length $Z_1$ of the media content (e.g., from segment 1 to n of the media content). An nth descriptive sub-stream may be played at non-continuous segments ($N_1$, $N_2$) of the media content.

The descriptive sub-streams shown in FIG. 5 may be created by specifying the time (or times) when a particular piece of descriptive content is shown with reference to the media stream segments. For example, when a television displays the name of an actor, actress, director, etc. at the beginning of a movie, a descriptive sub-stream may be displayed with information about the actor and/or links to more information about the actor during those segments of the media stream displaying the actor's name. In another example, descriptive content may be displayed that includes links about the movie for the entire length of the movie.

Figure 6:
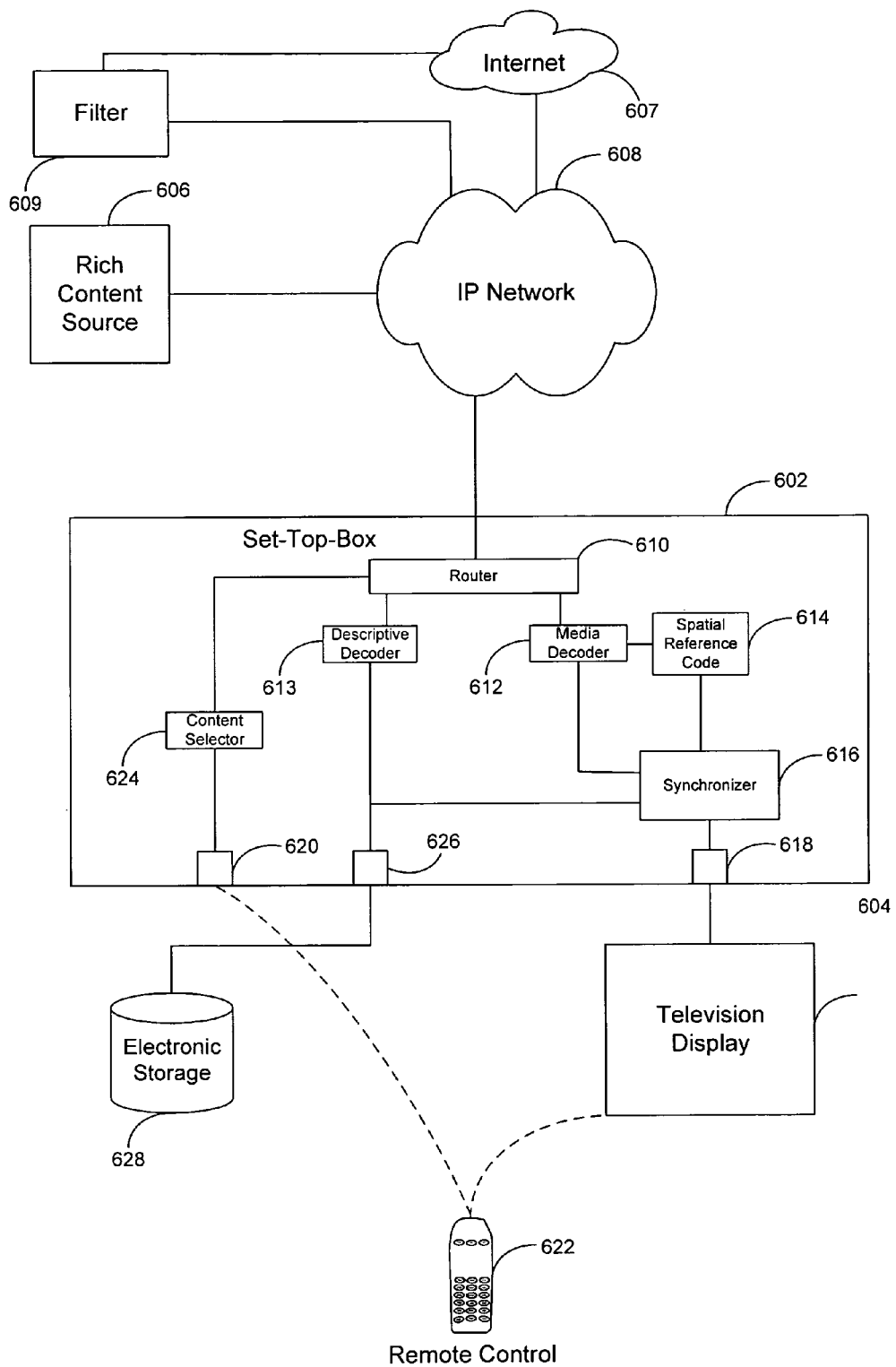
FIG. 6 shows a system for processing and displaying rich media content according to embodiments of the invention.

The segmentation of the media stream into a predefined number of segments may be performed as part of the encoding and packetization of the media content sent over an electronic network. For example media compression and encoding techniques such as MPEG-2 and MPEG-4 include the generation of a spatial reference code for frames of the media stream in order to keep the media content playing in the proper sequence and at the proper rate. FIG. 6 shows additional details of a set-top-box 602 that functions as a media player to process rich content media for playing on a media playing device, which in this case is a television display 604. In system 600, the rich content source 606 is streamed through an IP network 608 to the set-top-box 602 in the viewer's television viewing location. The rich content stream may include a media stream and descriptive stream that get separately routed through router 610 in the set-top-box 602.

The router 610 routes the media stream to media decoder 612 and the descriptive stream to a descriptive decoder 613. The media decoder 612 may generate a decoded media stream and a spatial reference code 614 that may provide sequence and/or timing data for playing the frames of media content on the television display 604. The spatial reference code 614 data may also be sent to a synchronizer 616 that synchronizes the media content and the descriptive content being displayed. The synchronizer 616 may use data from the spatial reference code 614 as a standard for aligning the decoded media stream with one or more descriptive sub-streams in the decoded descriptive stream. The synchronized media and descriptive content is then sent from the synchronizer 616 to a video output 618 that is in electronic communication with the television display 604.

The set-top-box 602 may also have a wireless signal receiver 620 that may receive commands from a remote control device 622 controlled by the television viewer. The viewer examining the descriptive content displayed on the television display 602 may send a command with the remote control 622 that activates a rich content channel to select an new item of descriptive or media content. When the command reaches the signal receiver 620, it may activate a content selector 624 to request the new descriptive or media content from the rich content source 606, or another information source accessible through the IP network 608. The functions of the content selector 624 may include the translation of the command sent by the remote control 622 into a rich content channel for displaying additional descriptive content and/or new media content on the television display 604. The content selector 624 may also extract, and/or format rich content channel information into an IP address, URL, etc. that can be used to route information queries to the rich content source 606 or other information sources through the IP network 608. This mechanism can also be used to implement forms where an element of the content descriptor could be a question or survey. The user provides their response which is then routed to the specified address or URL for compilation, analysis, storage, etc. This can further increase the two-way functionality of the invention.

The set-top-box 602 may also include an output 626 connected to the descriptive decoder 613 that outputs the descriptive content to an electronic storage medium 628 (e.g., a hard disk drive, a flash memory unit, a CD-ROM disc, a DVD-ROM disc, a tape drive, etc.). The electronic storage medium 628 may be coupled to and/or incorporated in a consumer electronic device such as a computer, personal digital assistant, digital video recorder, portable digital media player, cellular telephone, etc. The output 626 may be configured to send information to the electronic storage medium 628 wirelessly and/or via a wire-line connection. The stored descriptive content, which may be stored as all or part of a rich content file that was created at the rich content source 606, can be played on the television display 604, or some other media playing device at the viewer or listener's convenience.

Embodiments also include the set-top-box 602 accessing content from the public Internet 607 via the IP network 608. The content may be accessed through direct communications between the IP network 608 and the public Internet 607, or the content may first pass through a content filter 609 before entering the IP network 608. The content filter 608 may block the transmission of content from the public Internet 607 that fails to meet the pre-set standards for the content provider, the type of content, etc. In other embodiments, the content filter 609 may operate in the IP network 608 and act a gatekeeper for the transmission of content from the network 608 to the set-top-box 602. An authorized user operating remote control 622 may decide whether access to the public Internet 607 is routed through the content filter 609, and set the parameters for the content passed and/or blocked by the filter 609.

Figure 7A:
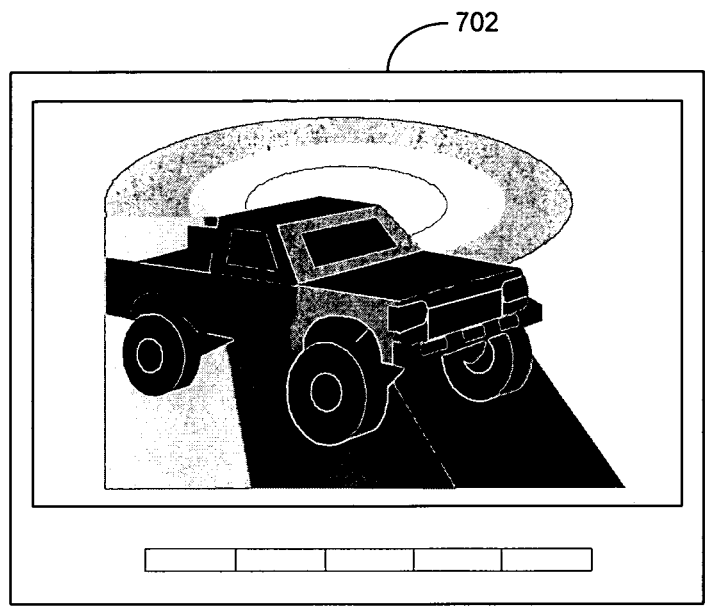
FIG. 7A shows a television displaying a media content stream.
Figure 7B:
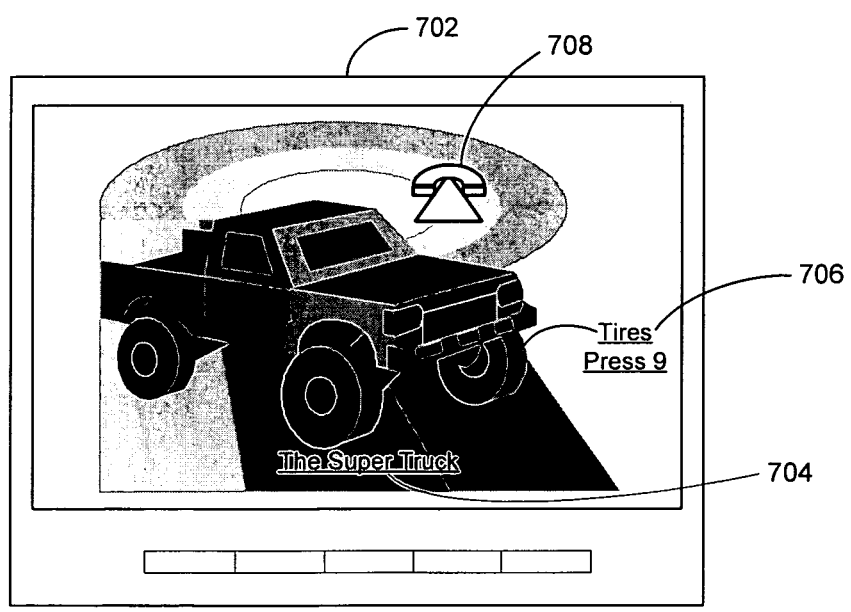
FIG. 7B shows a television displaying the media content stream and a descriptive stream according to embodiments of the invention.

As noted above, the descriptive content may be synchronized to play on a media playing device during the relevant segments of played media content. The descriptive stream may also contain instructions for spatial placement of the descriptive content overlaying the media content on the playing device. For example, a rich content file created to hold the descriptive content may include commands for the spatial placement of descriptive text, icons, etc. on the video display of a media playing device. FIG. 7A shows a media playing device 702 displaying a frame of media content without any overlying descriptive content. FIG. 7B shows the same frame of media content with overlying descriptive content also being displayed on the media playing device 702. This embodiment shows that multiple items of descriptive content, such as text 704, a numerical hyperlink 706, and an iconographic hyperlink 708 displayed over the media content frame. The placement of each of these descriptive content items may be predefined using, for example, spatial placement instructions such as X-Y grid coordinates of the display area.

Figure 7C:
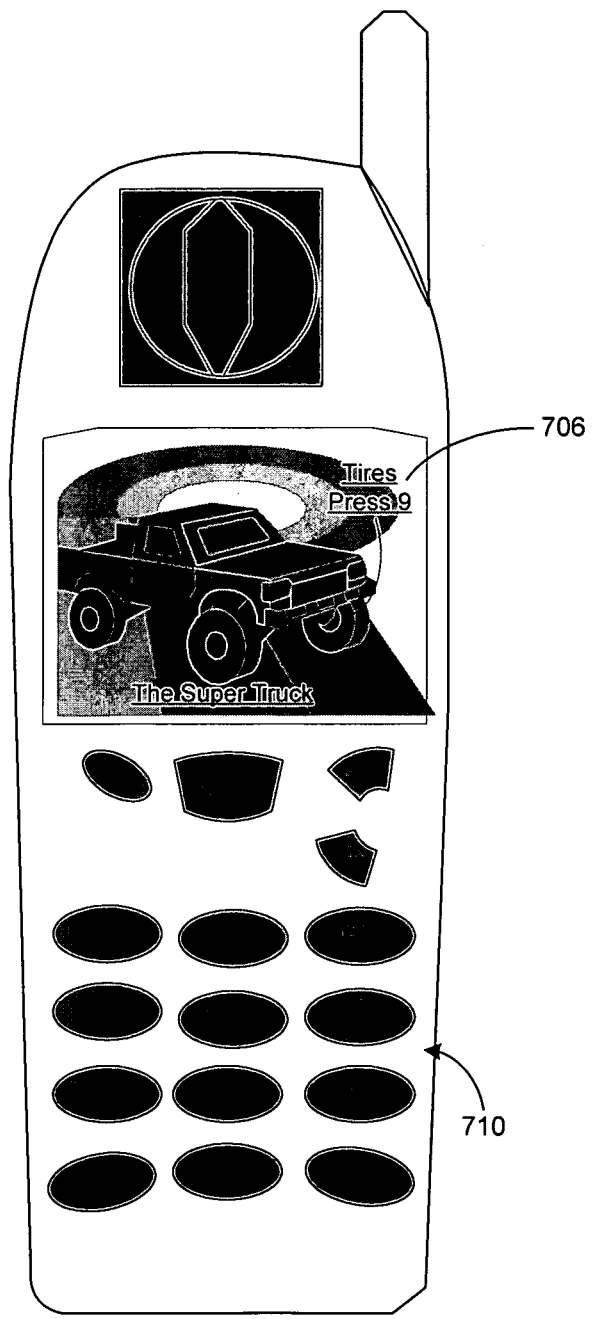
FIG. 7C shows a wireless device displaying a media and content stream according to embodiments of the invention.

FIG. 7C shows a cellular telephone 710 acting as a media playing device that is playing the frame of media content and descriptive content shown on the media playing device 702 in FIG. 7B. A cellphone viewer may use the cellphone's 710 keypad to activate a rich content channel associated with the text, links, icons, etc. of the displayed descriptive content. For example, the descriptive content may include a link 708 that is associated with a rich content channel for dialing a telephone number. The cellphone viewer/operator can press the keypad button that matches the number displayed in the link 708 to have the cellphone automatically dial the telephone number associated with the link.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the electrode" includes reference to one or more electrodes and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of playing a rich content stream comprising a media stream and a descriptive stream, the method comprising:

receiving, at a media encoder, media content from a media content source;

generating, at the media encoder, the media stream from the content, the media stream comprising a single file including the media content;

obtaining descriptive content from an Internet web site;

selectively routing the descriptive content through a content filter to control the types of content received from the Internet web site wherein a remote control device is used to engage the content filter and the remote control is used to set parameters for the content to be passed or blocked by the content filter;

generating the descriptive stream from the descriptive content;

transmitting the rich content stream, comprising the media stream and the descriptive stream as separate streams, over a network, allowing the media stream to be played, and the descriptive stream to be ignored, by media players incapable of playing the descriptive stream;

receiving the rich content stream at a media player;

synchronizing the media stream and the descriptive stream at the media player so that information in the descriptive stream is temporally synchronized with media content playing from the media stream;

simultaneously displaying;
   on the media player, the media stream and, upon placement of a cursor over a selected location on the media player viewing screen, descriptive content comprising one or more descriptive links, wherein the descriptive content displayed on the media player viewing screen is made not visible by moving the cursor from the selected location;
   on a descriptive data player that is physically separate from the media player a portion of the media stream playing on the media player along with a first portion of the descriptive stream temporally synchronized with the portion of the media stream playing on the media player;

providing, in the descriptive stream, a display of scene selections, each of the scene selections corresponding to a different scene portion of the same media stream, each scene selection further having a searchable descriptive file, wherein with each descriptive file searched in response to a search query, a thumbnail shot of the scene selection corresponding to the descriptive file that satisfies the search query is presented and selectable for playing at the scene portion of the media stream;

in response to a user selection of a scene selection in the descriptive stream, playing a scene portion of the media stream corresponding to the selected scene selection; and selectively storing a portion of the descriptive content to a home media storage device by activating a storage command on the remote control while the temporally synchronized media stream and descriptive stream are currently playing on the media player and descriptive data player respectively, wherein activation of the storage command does not cause storage of any portion of the media stream.

2. The method of claim 1, further comprising playing the descriptive stream on the media player after being activated by a user.

3. The method of claim 1, further comprising automatically playing the descriptive stream on the media player until a user deactivates the automatic playing of the descriptive stream.

4. The method of claim 1, wherein the descriptive stream comprises data associated with the media content playing on the media player.

5. The method of claim 4, wherein the data comprise an email address link, an Internet URL link, scene location data, actor data, director data, producer data, studio data, broadcaster data, program data, product data, soundtrack data, song data, artist data, guest data, history data, recipe data, or map data.

6. The method of claim 1, wherein the home media storage device comprises a hard disk drive.

7. The method of claim 6, wherein the hard disk drive provides data to a device selected from the group consisting of a computer, a personal video recording device, digital video recording device, a personal digital assistant, an audio device, a MP3 player, a television set-top box, and an IPTV adaptor.

8. The method of claim 1, wherein the user activates the playing of the descriptive stream through the remote control device.

9. The method of claim 8, wherein the remote control device is configured to control a cursor on the media player with a roller ball or arrow keys.

10. The method of claim 9, wherein the remote control can toggle the descriptive stream on and off, and wherein deactivated descriptive stream appears when the cursor passes over it on the media player.

11. The method of claim 1, wherein the media stream comprises an audio stream, a video stream, or an audio-video stream.

12. The method of claim 1, wherein the media player comprises an audio-video decoder in communication with a playing device.

13. The method of claim 12, wherein the media player comprises an MP3 player, a VC-1 decoder, or a RealNetworks decoder.

14. The method of claim 12, wherein the playing device comprises a television.

15. The method of claim 12, wherein the playing device comprises an audio system.

16. The method of claim 12, wherein the audio-video decoder comprises an MPEG decoder.

17. The method of claim 1, wherein the rich content stream is received by the media player through an IP network.

18. The method of claim 1, wherein the rich content stream can be stored on a media storage device separate from the media player.

19. A method of providing rich media data to a media player operated by a user, the method comprising:
creating a media file comprising media content;
creating a single rich content file separate from the media file, wherein the rich content file comprises descriptive content related to the media content, and wherein the descriptive content of the rich content file is obtained from the Internet and the descriptive content of the rich content file so obtained is selectively filtered to control the types of rich content received from the Internet by selectively routing the descriptive content through a content filter, wherein a remote control device is used to engage the content filter and the remote control is used to set parameters for the content to be passed or blocked by the content filter;
creating, in the descriptive content, a set of scene selections, each of the scene selections corresponding to a different scene portion of the same media stream;
streaming the media file and the rich content file across an electronic network as separate streams, allowing the media file to be played, and the rich content file to be ignored, by media players incapable of playing the rich content file;
synchronizing, with the media player, a media stream from the media file with a descriptive stream from the rich content file so that the descriptive content in the descriptive stream is temporally synchronized with media content playing from the media stream, the media stream comprising a single file including the media content;
simultaneously displaying;
   on the media player, the media stream and, upon placement of a cursor over a selected location on the media player viewing screen, descriptive content comprising one or more descriptive links, wherein the descriptive content displayed on the media player viewing screen is made not visible by moving the cursor from the selected location;
   on a descriptive data player that is physically separate from the media player a portion of the media stream playing on the media player along with a first portion of the descriptive stream temporally synchronized with the portion of the media stream playing on the media player, wherein displaying the descriptive stream comprises displaying the set of scene selections, each scene selection further having a searchable descriptive file, wherein with each descriptive file searched in response to a search query, a thumbnail shot of the scene selection corresponding to the descriptive file that satisfies the search query is presented and selectable for playing at the scene portion of the media stream;
in response to a user selection of a scene selection in the descriptive stream, playing a scene portion of the media stream corresponding to the selected scene selection; and
selectively storing a portion of the descriptive content to a home media storage device by activating a storage command on the remote control while the temporally synchronized media stream and descriptive stream are currently playing on the media player and descriptive data player respectively, wherein activation of the storage command does not cause storage of any portion of the media stream;
receiving the media file and the rich content file at a second media player, the second media player being incapable of playing the rich content file;
ignoring the rich content file at the second media player; and
playing the media file at the second media player.

20. The method of claim 19, wherein the method further comprises activating the playing of the descriptive stream while the media stream is playing, wherein descriptive content from the descriptive stream is not played until being activated by the user.

21. The method of claim 20, wherein the user activates the playing of the descriptive stream with the remote control device.

22. The method of claim 19, wherein the electronic network comprises the Internet.

23. The method of claim 19, wherein at least a portion of the electronic network comprises a wireless local area network.

24. The method of claim 19, wherein the media player comprises an audio-video decoder in communication with a playing device.

25. The method of claim 24, wherein the playing device is selected from the group consisting of a television, a stereo, a desktop computer, a laptop computer, a tablet computer, a personal digital assistant, a portable digital audio player, and a cellular telephone.

26. The method of claim 19, further comprising selectively storing the rich content file on an electronic storage device, wherein the electronic storage device comprises a hard disk drive, or a flash memory device and wherein the selective storage of the rich content file is caused by activating a storage command on the remote control.

27. The method of claim 19, further comprising selectively storing the rich content file on an electronic storage device, wherein the selective storage of the rich content file is caused by activating a storage command on the remote control, and wherein the electronic storage device provides data to a device selected from the group consisting of a computer, a personal video recording device, digital video recording device, a personal digital assistant, a television set-top box, a cellular telephone, a portable digital audio player, a radio, and an IPTV adaptor.

28. The method of claim 19, wherein the method comprises ignoring the descriptive stream while the media stream is playing if the media player is incapable of playing the descriptive stream.

29. The method of claim 19, wherein the media content comprises a program, advertisement, commercial, webcast, movie, or song.

30. A method of providing rich media content to a television, the method comprising:
- receiving a rich content stream at a television, the rich content stream comprising a media stream and a descriptive stream corresponding to the media stream, wherein the media stream comprising a single file including the media content and the descriptive stream are transmitted as separate streams, allowing the media stream to be played, and the descriptive stream to be ignored, by media players incapable of playing the descriptive stream and wherein the descriptive stream is obtained from the Internet and the descriptive stream so obtained is selectively filtered to control the types of content received from the Internet and included in the descriptive stream by selectively routing the descriptive content through a content filter, wherein a remote control device is used to engage the content filter and the remote control is used to set parameters for the content to be passed or blocked by the content filter;
- synchronizing the media stream and the descriptive stream at the television so that information in the descriptive stream is temporally synchronized with media corresponding content playing from the media stream; and
- simultaneously displaying;
  - on the television, the media stream and, upon placement of a cursor over a selected location on the television viewing screen, descriptive content comprising one or more descriptive links, wherein the descriptive content displayed on the television viewing screen is made not visible by moving the cursor from the selected location;
  - on a descriptive data player that is physically separate from the television a portion of the media stream along with a first portion of the descriptive stream temporally synchronized with the media stream, the displayed part of the descriptive stream configured for user interactivity with the descriptive stream, the descriptive stream comprising a display of scene selections, each of the scene selections corresponding to a different scene portion of the same media stream, each scene selection further having a searchable descriptive file, wherein with each descriptive file searched in response to a search query, a thumbnail shot of the scene selection corresponding to the descriptive file that satisfies the search query is presented and selectable for playing at the scene portion of the media stream;
- in response to a user selection of a scene selection in the descriptive stream, playing a scene portion of the media stream corresponding to the selected scene selection; and
- selectively storing a portion of the descriptive content to a home media storage device by activating a storage command on the remote control while the temporally synchronized media stream and descriptive stream are currently playing on the media player and descriptive data player respectively, wherein activation of the storage command does not cause storage of any portion of the media stream.

31. The method of claim 30, further comprising displaying an electric program guide on the television, wherein the electronic program guide is sent through the media stream.

32. The method of claim 30, further comprising receiving a selection from a user, wherein the media stream displayed in response to the selection has media content selected from the group consisting of a television program, a movie, a commercial, an infomercial, a documentary, a weather report, and a news report.

33. The method of claim 30, wherein the method comprises receiving a selection on the remote control device from the user causing the downloading to an electronic storage device a rich content file related to the media stream displayed in response to the selection wherein the electronic storage device comprises a hard disk drive, or a flash memory device.

34. The method of claim 33, wherein the electronic storage device is a hard disk drive or flash memory component that is in electronic communication with a personal video recorder.

35. The method of claim 34, wherein the personal video recorder is in electronic communication with the television.

* * * * *